United States Patent [19]

Bower

[11] Patent Number: 4,579,353
[45] Date of Patent: Apr. 1, 1986

[54] PIPE SEAL HAVING ELASTOMERIC LINER WITH RAMP MEANS

[75] Inventor: Edwin S. Bower, Bloomfield Hills, Mich.

[73] Assignee: Lydall, Inc., Chicago, Ill.

[21] Appl. No.: 669,531

[22] Filed: Nov. 8, 1984

[51] Int. Cl.[4] .............................................. F16J 15/12
[52] U.S. Cl. ................... 277/207 A; 277/50; 285/231; 285/345; 285/379
[58] Field of Search .......... 277/50, 166, 207 R, 277/207 A, 207 B, DIG. 2; 285/110-113, 230, 231, 345, 379

[56] References Cited

U.S. PATENT DOCUMENTS

| 3,073,609 | 1/1963 | Hamilton | 277/207 B X |
| 3,081,102 | 3/1963 | Murray et al. | 277/207 A X |
| 4,223,895 | 9/1980 | Roberts et al. | 277/DIG. 2 X |
| 4,394,024 | 7/1983 | Delhaes | 277/207 A |

FOREIGN PATENT DOCUMENTS

| 2014329 | 10/1971 | Fed. Rep. of Germany | 285/110 |
| 7803870 | 10/1979 | Sweden | 277/DIG. 2 |
| 1260263 | 1/1972 | United Kingdom | 285/110 |

Primary Examiner—Robert S. Ward
Attorney, Agent, or Firm—Dressler, Goldsmith, Shore, Sutker & Milnamow, Ltd.

[57] ABSTRACT

A seal for a stationary pipe connected to a housing or chamber designed for high fluid pressures. The seal comprises a generally cylindrical metal shell and an elastomeric sealing liner bonded to the inner surface of the shell. The sealing liner has two sealing zones and a gradual ramp formation for centering and guiding the pipe thereinto during assembly.

6 Claims, 4 Drawing Figures

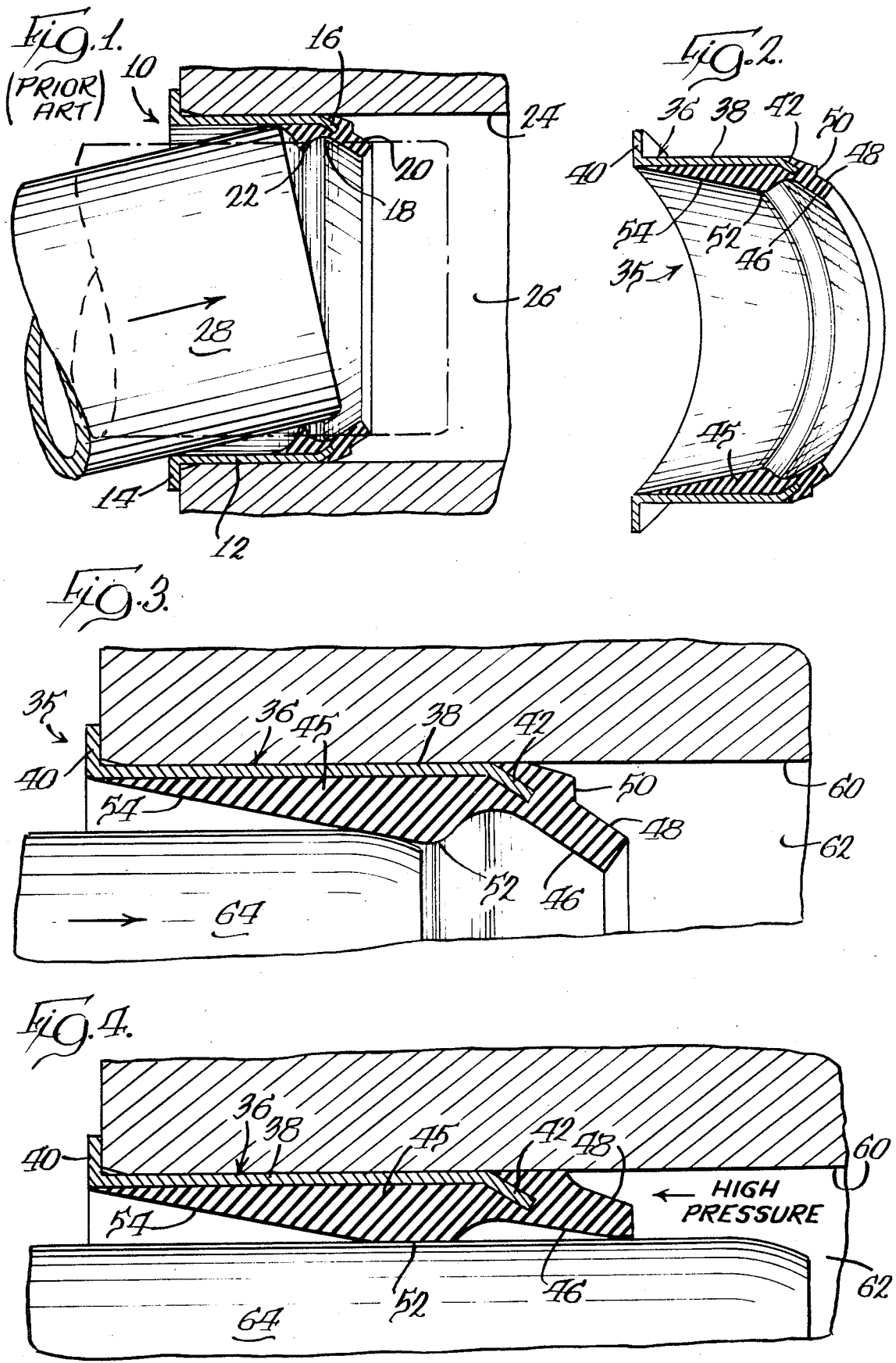

PIPE SEAL HAVING ELASTOMERIC LINER WITH RAMP MEANS

BACKGROUND OF THE INVENTION

This invention relates to elastomeric seals for pipes and, more particularly to an elastomeric seal for sealing pressure conditions on a stationary pipe.

Frequently it is necessary to circulate a liquid or gas under pressure, or to transmit pressure through a medium from one point to another through a tube to energize controls or produce a pressure related event. Occasionally, the only conection between the fluid-carrying pipe and the chamber or structure into which the fluid is injected is the seal around the pipe. In such applications, the pipe seal must function efficiently to facilitate assembly as well as to prevent fluid leakage.

Elastomeric seals in a wide variety of configurations have been provided for achieving a seal between a rotating shaft and a housing wherein a pressurized fluid environment is located on one side of the seal. A prior art search has revealed the following U.S. Pat. Nos. 1,598,501; 1,969,797; 2,209,578; 2,348,587; 2,692,785; 2,804,325; 2,858,150; 2,893,770; 3,049,357; 3,394,939; 3,601,418; and 3,940,155. With the exception of U.S. Pat. No. 2,348,587, which teaches a seal for a spherical ball joint, all of the references cited relate to seals for a shaft which rotates or reciprocates relative to another part. The cited references disclose seals having only a single, annular sealing zone and other seals having multiple sealing zones, such as, U.S. Pat. Nos. 2,858,150; 3,049,357; 3,394,939; and 3,940,155.

For ease of assembly operations, it is desirable that, a cylindrical or annular seal be simply press fittable into its associated bore and there be retained under intended operating conditions. Elastomeric materials, such as rubber or suitable compressible plastics, are lacking in the rigidity necessary to enable such easy placement and retention. In an effort to overcome this problem, U.S. Pat. No. 2,692,785 discloses a seal having a rigid metallic shell and an elastomeric sealing member bonded thereto. However, that structure nonetheless has the elastomeric material, which is subject to wear and compression fatigue, in contact with the bore in which it is positioned.

More recently, there have been utilized pipe seals having a cylindrical rigid metal shell and an elastomeric material bonded only to the inner surface of that shell. The elastomeric material was shaped to afford two zones of sealing area on the pipe. It was found, however, that during operational assembly and insertion of the pipe through the seal, the pipe had a tendency to snag or catch on one of the elastomeric lips with the result that one of the zones of sealing was damaged or rendered ineffective.

There thus exists a need for a pipe seal of simple yet sturdy construction which is press-fittable into zones and means for facilitating the operational assembly of the pipe therethrough.

SUMMARY OF THE INVENTION

The present invention provides a pipe seal having a relatively rigid metal shell which is press-fittable into a bore. The shell has an external flange for axial positioning and is retained in the bore in durable metal-to-metal contact. An elastomeric material sealing liner is bonded to the inner surface of the shell and extends forwardly of the inner end of the shell. The sealing liner is formed with two axially spaced lips to provide two zones of sealing area on the pipe. One of the lips is formed in a manner which facilitates the non-injurious entry of the pipe therethrough during assembly. The other lip is formed in a manner so that its sealing efficiency is increased when acted upon by high fluid pressures in the chamber with which it is associated. The seal is simple to install and use and yet is most efficient for a variety of intended uses, including temperatures ranging from −20 degrees to 300 degrees F. and pressures up to 350 psi.

Other features and advantages of the invention will be apparent from the following description and claims and are illustrated in the accompanying drawings which show structure embodying preferred features of the present invention and the principles thereof.

BRIEF DESCRIPTION OF THE DRAWINGS

FIG. 1 is a partial cross-sectional view through a prior art sealing arrangement illustrating insertion of the pipe during assembly;

FIG. 2 is a perspective view partially cut away of a pipe seal embodying the principles of the invention;

FIG. 3 is a partial longitudinal sectional view of the improved sealing arrangement of the invention showing the pipe being inserted thereon; and FIG. 4 is a similar view showing the full assembled sealing arrangement.

DETAILED DESCRIPTION OF THE INVENTION

Referring with greater particularity to the disclosure of the drawings, FIG. 1 discloses a pipe sealing arrangement utilizing a prior art seal indicated generally by the reference character 10. Pipe seal 10 comprises a cylindrial metal shell 12 having an integral outwardly flaring flange 14. At its forward end, the shell 12 is formed with an inwardly tapering, frusto-conical segment 16. An elastomeric liner 18 is bonded to the inner surface of the shell 12 and over the segment 16 thereof. The liner 18 comprises an inwardly tapering front lip 20 and an axially spaced annular lip 22.

The pipe seal 10 is snugly press-fitted within the bore 24 of a high pressure chamber 26. To complete the operational assembly of the sealing arrangement, it is necessary to insert a suitably sized pipe, such as 28, into the pipe seal 10. Since compression of the annular lip 22 is required, the pipe 28 must be forced into and through the pipe seal 10. As illustrated, the leading edge of the pipe 28 was lodged against, and was impeded by, the annular lip 22. Frequently, this assembly operation resulted in damage to the lip 22 and loss of sealing efficiency. Even when non-injurious assembly was achieved, the annular lip 22 afforded a relatively narrow zone or area of sealing contact with the pipe.

Turning now to FIGS. 2 through 4 of the drawings, the improved pipe seal of the invention is generally by the numeral 35. The pipe seal 35 comprises a metal shell 36 having a cylindrical body 38, a radially extending rear flange 40, and an inwardly tapered, frusto-conical front segment 42.

An elastomeric liner 45 is bonded to the inner surfae of the shell 36 and encases the shell front segment 42. The liner 45 comprises an inwardly tapering, generally frusto-conical front lip 46 which extends forwardly of the shell front segment 42. The outer face 48 of the front lip 46 is formed with a notch or shoulder 50. An annular lip 52 is also formed in the liner 45 positioned axially rearwardly of the lip 46. It is important to note that the annular lip 52 is also formed in the liner 45 positioned axially rearwardly of the lip 46. It is important to note that the annular lip 52 does not terminate abruptly within the shell 36 as in the prior art structure. As illustrated, the annular lip 52 tapers gradually rearwardly over substantially the entire length of the shell cylindrical body 38 thereby affording an elongated annular ramp surface 54.

To assemble the improved sealing arrangement of the invention, the pipe seal 35 is press-fitted into the bore 60 of a high pressure housing 62. An appropriately sized pipe such as 64 is then inserted into and through the pipe seal 35. During this assembly operation, the ramp surface 54 functions as a self-centering means for the pipe 64 and also provides a gradual and smooth entry surface for the pipe. As a result, all danger of snagging or injury to the annular lip 52 is eliminated. However, a portion of the ramp surface 54 becomes compressed after operational assembly so that a wider and more efficient sealing area with the pipe is formed (see FIG. 4).

The front lip 46 is deflected forwardly by the inserted pipe 64 and stretched into tight sealing engagement therewith. It is important to note that application of high pressure in the housing 62 acts on the outer face 48 and shoulder 50 of the lip 46 to force or deflect said lip into ever tighter and more efficient sealing engagement with the pipe 64.

While a preferred embodiment of the invention has been illustrated and described herein, it will be appreciated that changes and variations may be made by those skilled in the art without department from the spirit and scope of the appended claims. The invention is defined by the claims that follow.

What is claimed is:

1. A pipe seal for sealing between a housing and a shaft communicating with said housing through a bore therein, said pipe seal comprising:
    a rigid shell comprising a metal cylinder having a radial flange at the trailing end thereof and an inwardly tapering frusto-conical segment at the leading end thereof and press-fittable into said bore;
    an elastomeric liner bonded to the inner surface of said shell and covering substantially the entire inner surface of said cylinder;
    lip means on said liner for engaging said pipe to provide a pair of sealing zones therewith; and
    ramp means on said liner for centering said pipe and guiding the entry thereof into and through said pipe seal during operational assembly.

2. A pipe seal according to claim 1 wherein said lip means comprises a first lip encasing said frusto-conical segment and extending forwardly thereof, and a second annular lip spaced axially rearwardly of said first lip.

3. A pipe seal according to claim 2 wherein said ramp means comprises a gradually sloping segment of said liner extending rearwardly from said second lip to merge with the inner surface of said cylinder adjacent the trailing end thereof.

4. A pipe seal according to claim 3 wherein said first lip includes an inwardly tapered outer surface and a shoulder formed in said outer surface, said outer surface and shoulder being adapted to be acted upon by fluid pressure in the housing to force the same into tight sealing engagement with the pipe.

5. In combination, a seal and a stationary pipe of predetermined diameter retained in said seal and communicating with a housing, said seal comprising:
    a generally cylindrical metal shell in an opening in said housing, said shell including a radial flange engaging the outside of the housing and a frusto-conical segment positioned within the housing opening;
    an elastomeric liner bonded to the interior surface of said shell, said liner comprising
    a front lip encasing said frusto-conical segment and extending axially forwardly thereof in sealing engagement with said pipe,
    an annulus on said liner spaced axially rearwardly of said first lip in sealing engagement with said pipe, and
    a gradually tapering segment of said liner extending axially rearwardly from said annulus to merge with said shell at substantially the rear terminus thereof,
    said gradually tapering segment adapted to center said pipe and guide the same into the seal during assembly.

6. In the combination of claim 5 wherein said front lip comprises an inwardly tapering outer surface and a substantially radial shoulder, said outer surface and shoulder being adapted to be acted upon by fluid pressure in the housing by being urged into tighter sealing engagement with the pipe.

* * * * *